Oct. 23, 1962
R. B. RUSLING
3,059,760
BLADE-TYPE CONVEYOR
Filed June 23, 1958
2 Sheets-Sheet 1
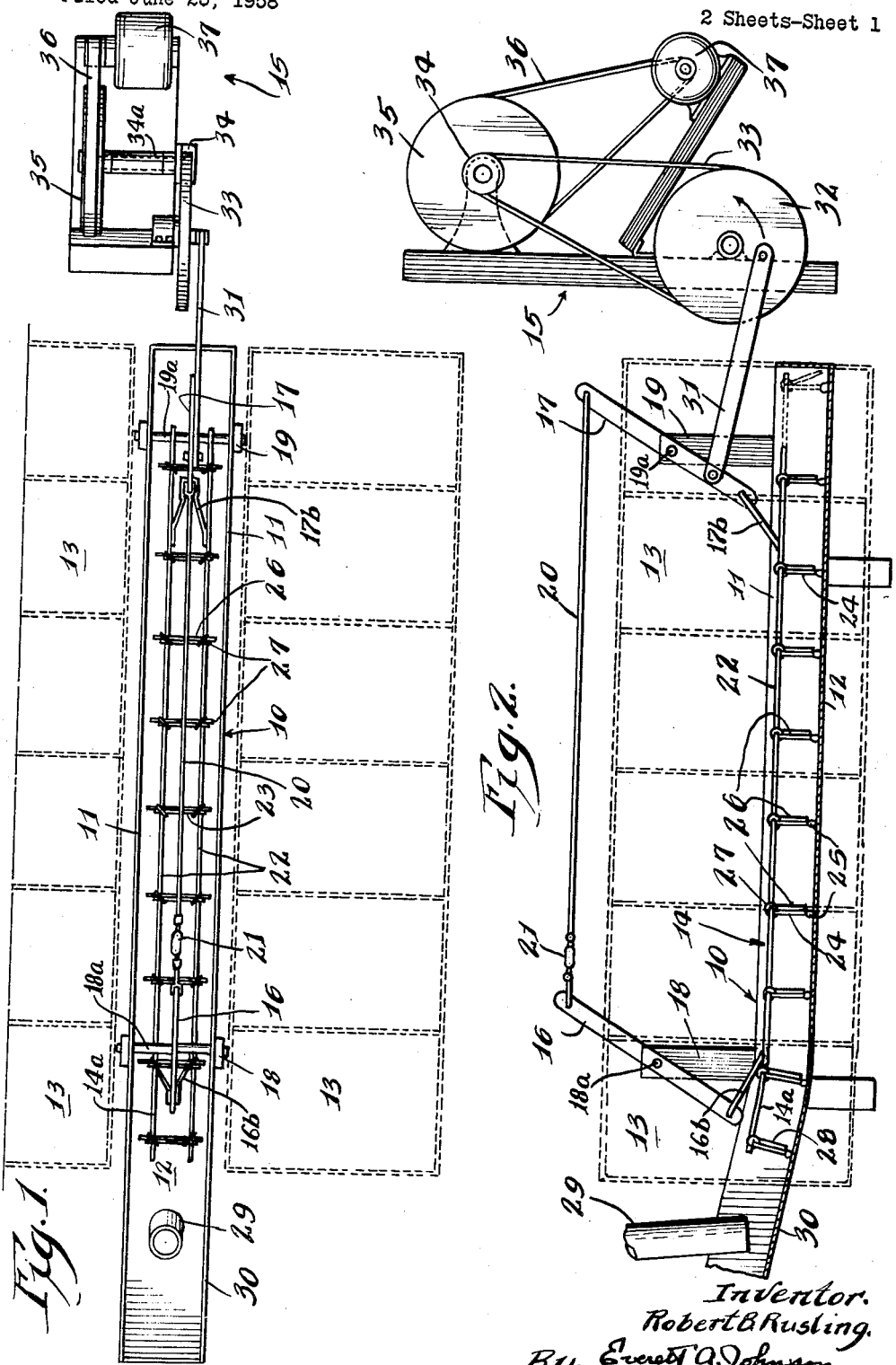
Inventor.
Robert B. Rusling.
By Everett A. Johnson
Attorney.

Oct. 23, 1962
R. B. RUSLING
3,059,760
BLADE-TYPE CONVEYOR
Filed June 23, 1958
2 Sheets-Sheet 2
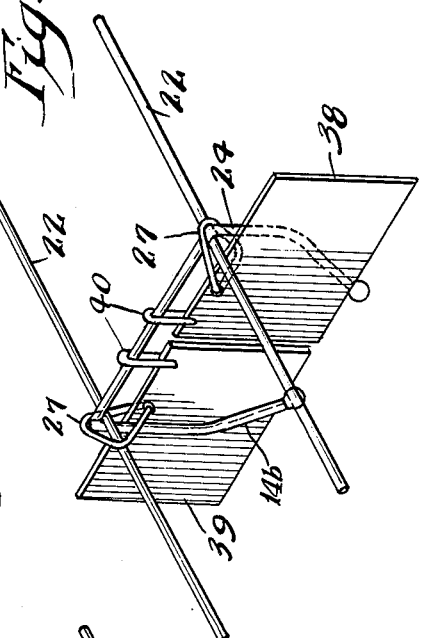
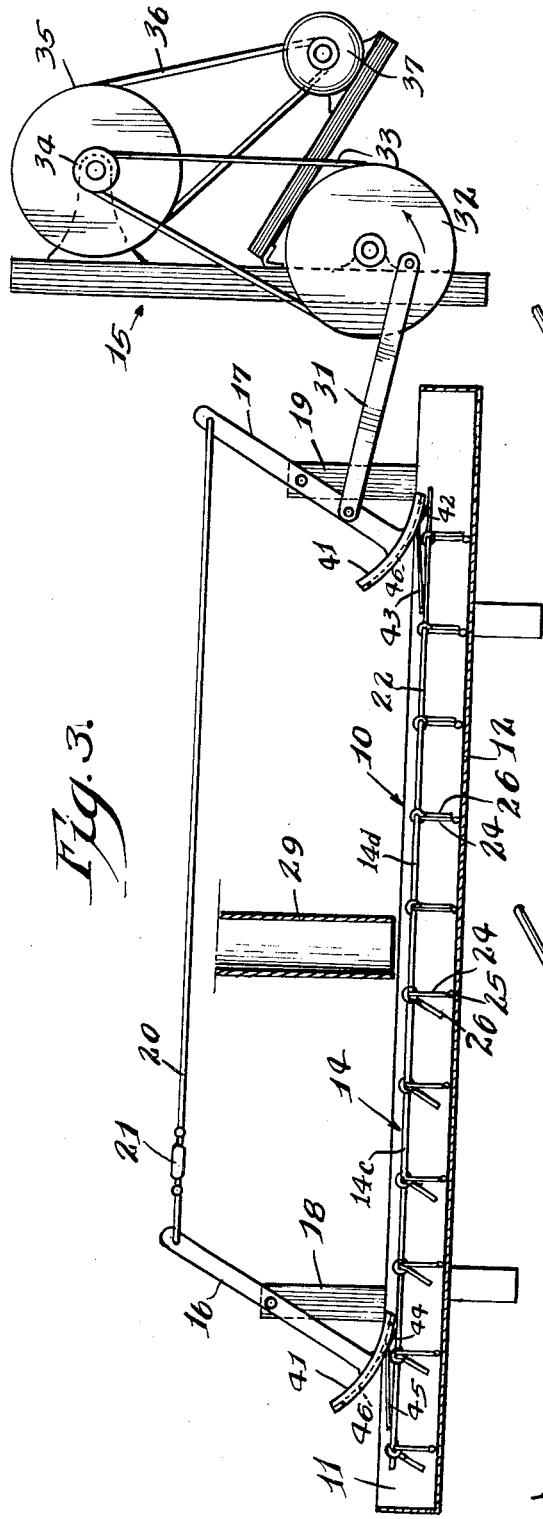
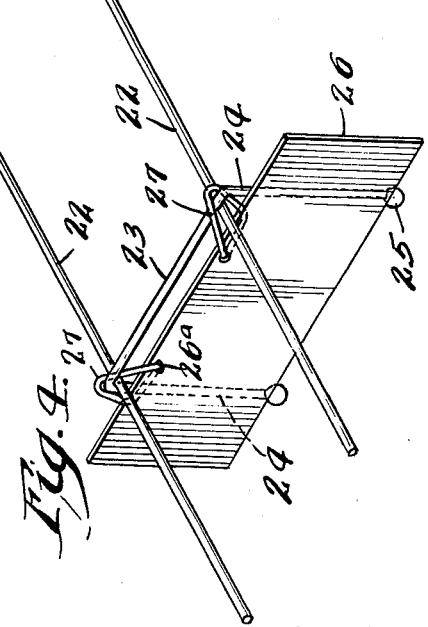
Inventor.
Robert B. Rusling.
By- Everett A. Johnson
Attorney.

United States Patent Office 3,059,760
Patented Oct. 23, 1962

3,059,760
BLADE-TYPE CONVEYOR
Robert B. Rusling, Brandon, Miss., assignor to
Nat Cordis, Silver Lake, Wis.
Filed June 23, 1958, Ser. No. 743,635
13 Claims. (Cl. 198—224)

This invention relates to conveyors for flowable solid materials and, more particularly, to a feeding device for distributing pulverant materials along an open-topped trough accessible to stock including poultry.

The feeding of livestock, such as poultry, on a large scale necessarily involves much manual attention. Accordingly, a primary object of this invention is to provide a feeder of large capacity in which the feeding can be controlled with a minimum of attention by an operator. Another object is to provide a method and automatic means for uniformly distributing a supply of fresh feed within a flock feeder. An additional object is to provide an automatic and controllable feeder which is rugged and inexpensive in construction. A further object is to provide an apparatus which maintains a continuously renewed supply of feed in a trough and minimizes the possibility of accumulating stale feed along the path of the conveyor. It is also an object of this invention to provide a conveyor mechanism which is quiet running, which requires a minimum of attention for maintenance of its mechanical components, and which does not tend to disturb the feeding poultry. Likewise, it is a further object to provide a system which can handle various types of feed and without tending to grind the feed within the trough.

A further important object is to provide an apparatus which is readily expandable for various sizes of flocks of poultry but which is also efficient for use in connection with relatively small flocks. A more specific object of the invention is to provide a conveyor element which is of simple sturdy construction, and is uniform in its feed conveying capacity. These and other objects of my invention will become apparent to those skilled in the art as the description thereof proceeds.

Briefly, I attain the objects of my invention by providing a trough having an operating member oscillated therein. A plurality of evenly spaced blades are pivotally carried by the operating member. The blades may assume a generally vertical position during a pushing or feeding stroke, and on the return stroke the blades swing rearwardly and return over advanced feed in the trough, the length of the stroke in each direction being greater than the distance between the blades. The operating member comprises a trapezoidal frame including a pair of end levers, a flexible lattice pivotally fixed to the lower ends of the operating levers and a tie wire extending adjustably between the upper ends of the operating levers. The blades are suspended from the under side of the operating member or lattice; cross-wires of the lattice are turned downwardly to form supporting legs and against which the blades swing in assuming the vertical pushing or feeding position.

Feed is supplied to the trough by means of a delivery tube which discharges into an inclined chute, which is in alignment with the end of the feeding trough. An extension of the operating lattice carrying a paddle projects into the chute on alternate strokes and the paddle impels the feed from the chute into the inlet end of the trough.

Further details of the invention will be described by reference to the accompanying drawings wherein:

FIGURE 1 is a schematic plan view on my feeder showing the general assembly of parts;
FIGURE 2 is an elevation of the feeder of FIGURE 1;
FIGURE 3 is an elevation of another embodiment of my feeder; and
FIGURES 4 and 5 are perspectives showing details of blade forms and supports according to the invention.

Referring to the drawings, a feeding trough 10 having side walls 11 and floor 12 is disposed between two rows of cages 13. The poultry in cages 13 all have access to the trough 10.

A feeding track or operating lattice assembly 14 is arranged within the trough 10 and supports blades 26 thereon. A power unit 15 disposed adjacent one end of trough 10 is linked to the operating lattice assembly 14 and oscillates the assembly 14 with its blades 26 within the trough 10 to deliver feed from one end to the other. The motion or drive imparted to the assembly 14 is by way of a trapezoidal linkage comprising a first operating lever 16 and a second operating lever 17. Operating lever 16 is pivotally supported by the pivot rod 18a extending between the lever support 18 which straddles trough 10. Operating lever 17 in turn is pivotally supported by lever support 19 on pivot rod 19a.

The lower ends of the operating levers 16 and 17 are pivotally linked to the operating lattice 14 by means of rigid linkages 16b and 17b, respectively. The upper ends of the levers 16 and 17 are connected by overhead bracing wire or cable 20 which is provided with turnbuckle 21 for adjustment of tension in the cable 20 and hence the tension on the flexible lattice 14.

The operating lattice assembly 14 includes the parallel wires 22 which run the full length of each assembly unit 14. At spaced intervals, corresponding to less than the length of the stroke of the feed track 14, are plurality of cross-wires 23 having end portions bent downwardly to provide legs 24 depending from the parallel wires 22. The legs 24 may be provided with feet 25 such as of plastic or other low-friction material. These components 22–27 are illustrated in more detail by FIGURE 4.

The blades 26 are suspended from the assembly 14 by means of rings 27 which pass over the junction of the wires 22 with the cross-wires 23 and through the holes 26a. An extension 14a of the assembly 14 carries a hinged paddle 28 which operates within the feed chute 30 merging with the entry end of the trough 10. Feed is supplied to the chute 30 by feed supply tube 29.

The reciprocating power unit 15 is connected to the operating lever 17 by the connecting rod 31. Reciprocating drive motion is applied to the Pitman connecting rod 31 by drive wheel 32 which is in turn driven by drive wheel belt 33 running over drive pulley 34. The drive pulley 34 is fixed to drive shaft 34a which is rotated by transmission pulley 35. Transmission belt 36 driven by motor 37 runs over transmission 35 in a conventional manner. If desired the motor 37 may be controlled by a timer mechanism (not shown). Likewise, means may be provided for over-riding the timer mechanism in the event the quantity of feed in the trough 10 is diminished to a pre-selected amount.

As shown in FIGURES 1 and 2 of the drawings, the operating assembly 14 is moving from left to right with the blades 26 supported by the depending legs 24. However, when the assembly 14 is moved in the opposite direction, the blades 26 assume the position shown in phantom in FIGURE 2 at the trough end 10b.

When feed is delivered by the tube 29 to the chute 30, the conveyor assembly 14 is reciprocated by the oscillating power unit 15. In the position shown in FIGURES 1 and 2, the blades 26 push feed away from the chute 30 along the trough 10 to advance the feed an increment of the total length of the trough 10, for example, a distance of between about five and ten inches. This corresponds to the spacing of the cross-wires 22 and the blades 26 along the operating lattice 14.

The direction of motion of the operating assembly 14 is cyclically reversed by the power unit 15, and upon the return stroke of the operating assembly 14 the blades 26 lift up as above described and ride over the feed advanced within the trough 10 by the previous delivery stroke of the feed track or operating assembly 14.

The length of the stroke of the operating assembly 14 is greater than the spacing between the hinged blades 26 and may, for example, be a stroke of between six and eleven inches. In a typical installation of the blades 26 are about six inches apart and the stroke about seven inches.

The reciprocating cycle is repeated at a rate of from 15 to 50 strokes per minute with feed being supplied to the chute 30 as described. When the feed already discharged from the tube 29 has been moved along chute 30 by paddle 28 into trough 10 more feed takes its place but does not continue to discharge from the tube 29 when feed accumulates within the chute 30.

By the arrangement of the trapezoidal linkage, including the operating levers 16 and 17, the overhead bracing member 20, the rigid links 16b and 17b, and the flexible lattice wires 22, the operating assembly 14 is drawn to-and-fro without any buckling of the flexible operating assembly 14 and substantially all portions of the operating assembly 14 remain within the trough 10. However, the tendency of the extension 14a to rise on the return stroke of the assembly 14 is beneficial for the movement of the feed within the chute 30 by paddle 28, as will be apparent from FIGURE 2.

Another embodiment of the invention is illustrated by FIGURE 3 wherein feed delivered by tube 29 into the trough 10 intermediate the ends thereof is distributed in both directions to opposite ends of the trough 10. This is accomplished by means of two opposed arrays 14c and 14d of blades 26, both of which have its blades 26 suspended on the sides of the legs 24 remote from the tube 29. Operating levers 16 and 17 are provided with hold-down cams 41 having flanged cable grooves 46 which accommodate cables 42 and 43 and cables 44 and 45. Their opposite ends are fixed to the operating assembly 14c and 14d, respectively. The flanged cable groove 46 in the hold-down cams 41 receive the cables 42 to 45, as shown. When the trapezoidal drive linkage, including the operating levers 16 and 17, the tie member 20, and the operating assembly 14 (14c plus 14d), is oscillated by the drive unit 15 in the manner described above the array 14c and the array 14d alternately each advances feed in opposite directions from the region of the tube 29. In the position shown in FIGURE 3, the array 14c is riding over the feed and the array 14d is delivering feed from tube 29 along the trough 10. During the cycle the cams 41 hold down the adjacent ends of the operating assembly 14 and a smooth oscillating motion is imparted to the arrays 14c and 14d without any tendency of the remote ends to rise. As described with reference to FIGURES 1 and 2, the power unit 15 may be time and/or feed controlled.

With reference to FIGURE 5, I have provided a system for delivering feed in two parallel directions within a single trough 10. This may be accomplished by dividing the blades 26 into two blades 38 and 39. The blades 38 and 39 are suspended on opposite sides on the legs 24 and 24b and are supported by rings 27 and links 40. This modified blade assembly may be substituted for that of the operating assembly 14 and thereby providing a circuit within a single trough 10. If desired, an up-standing partition (not shown) may be arranged within the trough 10 and longitudinally thereof between the blades 38 and 39.

The blades 26 are preferably of light plate stock, being relatively thin and light so as to ride over the advanced feed as described. They may be of wood or plastic but are preferably of sheet metal. The parallel members 22 and the cross wires 23 are preferably of flexible wire such as frequently used in certain types of fencing. The trough 10 may be of a unitary sheet, but other constructions will be apparent to those skilled in the art in view of the teachings herein.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. In a reciprocating blade poultry feeder including a trough, an array of swingable blades operating in said trough, and reciprocatable means for supporting said array, the improved means for supporting said array comprising a trapezoidal frame having at least two pivotally mounted levers connected by a flexible operating member and a flexible tie member, the said operating member having a plurality of downwardly extending legs supporting the array of blades within said trough, hold-down means acting on said reciprocating member to retain said array of swingable paddles and operating member within said trough, said member reciprocating in substantially a single plane parallel to the said trough in its forward and backward strokes, said paddles alternately pushing and passing over.

2. The feeder of claim 1 which includes means actuating said frame for reciprocating said operating member.

3. In a reciprocating blade poultry feeder including a trough, an array of swingable blades operating in said trough, and reciprocatable means for supporting said array, the improved means for supporting said array comprising a trapezoidal frame having at least two pivotally mounted levers connected by a flexible operating member and a flexible tie member, the said operating member supporting the array of blades within said trough, said operating member comprising a wire lattice, cross-wires of said lattice being bent downwardly to form supporting legs for said operating member, and link means suspending the said blades from said lattice.

4. In a reciprocating blade poultry feeder including a trough, an array of swingable blades operating in said trough, and reciprocatable means for supporting said array, the improved means for supporting said array comprising a trapezoidal frame having at least two pivotally mounted levers connected by a flexible operating member and a flexible tie member, the said operating member supporting the array of blades within said trough, said operating member supporting said array and comprising a lattice of a pair of flexible wires braced by a plurality of cross-wires, said cross-wires having depending leg portions on which said operating member rides and against which said blades swing to a backed vertical position in a feed advancing stroke.

5. A poultry feed conveyor system of the reciprocating blade-type including trough means, at least one array of swingably supported blades, reciprocatable means for carrying said array of blades comprising a trapezoidal frame including a pair of vertically extending operating levers pivotally mounted at spaced points along said trough, an adjustable overhead tie member between the upper ends of said levers, a flexible ladder-like member extending between the lower ends of said levers within said trough, said member being provided with depending legs which support said member and blades above the bottom of said trough, means for reciprocating the array of blades carried by said frame within said trough whereby moving the array in one direction advances feed and movement in the opposite direction swings the blades rearwardly to pass over advanced feed in the trough, said array operating in a single plane substantially parallel to the bottom of said trough.

6. In a reciprocating blade feeder including a trough and at least one array of blades operating in said trough, the improvement comprising a trapezoidal frame having at least two pivotally mounted levers connected by a first member and a second member, the said first member supporting the array of blades within the trough and provided with supporting legs which support the said member and blades above the bottom of the said trough.

7. The feeder of claim 6 which includes means for reciprocating said members.

8. The feeder of claim 6 wherein said first member comprises a wire lattice, said supporting legs comprising depending portions of said lattice, and means hingedly supporting the said blades on said lattice.

9. In a reciprocating blade feeder including a trough and at least one array of blades operating in said trough, the improvement comprising a trapezoidal frame having at least two pivotally mounted levers connected by a first member and a second flexible member, the first member supporting the array of blades within said trough, said first member comprising a lattice of a pair of elongated flexible wires braced by a plurality of cross-wires, said cross-wires having depending portions on which said member rides within the trough and which restrain said blades in a vertical position during a feed advancing stroke.

10. A poultry feed conveyor system of the reciprocating blade-type including trough means, at least one array of hinged blades, means for supporting said array of blades comprising a trapezoidal frame including a pair of vertically extending operating levers pivotally mounted at spaced points along said trough, tie means between the upper ends of said levers, a flexible ladder-like operating member linked to the lower ends of said levers, said member being provided with trough-ward extending sub-members supporting said array of blades within said trough, means for reciprocating the said operating member within said trough whereby moving the blades in one direction advances feed and moving the blades in the opposite direction swings the blades rearwardly to pass over advanced feed in the trough, said array operating in a single plane substantially parallel to the bottom of said trough.

11. The conveyor system of claim 10 which comprises a pair of opposed arrays of blades and delivery means discharging between said arrays.

12. A poultry feed conveyor system of the reciprocating blade-type including trough means, at least one array of hinged blades, means for supporting said array of blades comprising a trapezoidal frame including a pair of vertically extending operating levers pivotally mounted at spaced points along said trough, tie means between the upper ends of said levers, a flexible ladder-like operating member linked to the lower ends of said levers and supporting said array of blades within said trough, and means for reciprocating the said operating member within said trough whereby moving the blades in one direction advances feed and moving the blades in the opposite direction swings the blades rearwardly to pass over advanced feed in the trough, each said blade being divided into two portions, each portion being mounted for swinging in opposite directions from the vertical, whereby feed is delivered in two parallel directions within the said trough.

13. In a reciprocatable trough feeder mechanism of the type wherein at least one array of longitudinally spaced paddles are operated within distribution means accessible to stock for feeding therefrom, the improvement which comprises at least one pair of spaced pivoted levers, each said lever comprising a reciprocatable arm, a curved operating member fixed transversely to the end of each said arm, an array of a plurality of spaced pusher paddles, said distribution means comprising a linear open-topped trough within which said paddles are disposed and in which said curved operating members reciprocate, dual flexible members in said trough between two such curved operating members, tie means between said pair of levers, said arms being reciprocatable in a plane parallel to the plane of the reciprocating path of said paddles, means securing said pusher paddles to said flexible members, link means between said flexible members and said operating members, said link means engaging a flexible member intermediate an end thereof whereby an end of said operating member supporting at least one paddle is vertically unrestrained.

References Cited in the file of this patent
UNITED STATES PATENTS

| | | |
|---|---|---|
| 605,621 | Acklin | June 14, 1898 |
| 996,624 | Dorr | July 4, 1911 |
| 2,552,743 | Simpson | May 15, 1951 |